United States Patent [19]
Hsu

[11] Patent Number: 5,865,991
[45] Date of Patent: *Feb. 2, 1999

[54] MONITORING SYSTEM FOR A DRINKING WATER PURIFICATION SYSTEM

[76] Inventor: Chao Fou Hsu, 109, Lane 316, Dah Shuenn 3th Rd., Kaohsiung, Taiwan

[ * ] Notice: The term of this patent shall not extend beyond the expiration date of Pat. No. 5,499,197.

[21] Appl. No.: 613,715

[22] Filed: Mar. 11, 1996

[51] Int. Cl.⁶ .................................................. B01D 17/12
[52] U.S. Cl. ............................... 210/87; 210/90; 210/93; 210/96.2; 210/100; 210/108; 210/258; 340/609
[58] Field of Search .................................. 210/85, 87, 90, 210/93, 96.1, 96.2, 100, 103, 108, 138, 143, 257.2, 258, 259, 321.69, 416.3, 636, 652, 739, 741, 746, 806, 195.2; 364/479.01, 479.1, 479.14, 496, 497, 499, 500, 501, 502, 509, 510, 550; 340/603, 606, 609

[56] References Cited

U.S. PATENT DOCUMENTS

| | | | |
|---|---|---|---|
| 3,856,676 | 12/1974 | Grimme et al. | 210/96.2 |
| 4,801,375 | 1/1989 | Padilla | 210/100 |
| 4,918,426 | 4/1990 | Butts et al. | 210/89 |
| 4,969,991 | 11/1990 | Valadez | 210/195.2 |
| 5,089,144 | 2/1992 | Ozkahyaogw et al. | 210/87 |
| 5,096,574 | 3/1992 | Birdsong et al. | 210/90 |
| 5,450,358 | 9/1995 | Seibert et al. | 364/497 |
| 5,494,573 | 2/1996 | Schoenmeyr et al. | 210/258 |
| 5,499,197 | 3/1996 | Fou | 210/143 |
| 5,676,824 | 10/1997 | Jeon et al. | 210/87 |

*Primary Examiner*—Joseph W. Drodge
*Attorney, Agent, or Firm*—David & Raymond; Raymond Y. Chan

[57] ABSTRACT

A monitoring device for a drinking water purification system comprising a microprocessor that controls the overall operations of the monitoring system, a LCD indicating circuit that relates information to maintenance personnel, a detecting means that analyses related data for determining the condition and extents of clogging of the filtration elements, a warning means that produces verbal or musical sound for warning consumers about the clogged condition of the water filtration elements, and a power switching means that cuts off electricity supply to the water pump of the purification system. In operation, the filtration elements will be clogged by impurities after being used for a period of time. If the filtration elements are clogged, the monitoring device will make a sound to warn of such condition of the filtration elements and will eventually cut off the power supply to the pump for stopping water delivery if the clogged filtration elements are not replaced after a certain period of time.

2 Claims, 11 Drawing Sheets

MONITORING SYSTEM FOR A DRINKING WATER PURIFICATION SYSTEM

BACKGROUND OF THE PRESENT INVENTION

The present invention relates generally to a drinking water purification system, and more particularly to a monitoring process and device for a drinking water purification system, which can monitor the system to make purified drinking water having a quality of purity in conformity with the standard of public health. The present invention is adapted for notifying maintenance personnel of when is the right time to replace the filtration elements or backwash a reverse osmosis filtration element included in the purification system.

The main culprits of the water pollution today include industrial waste, household waste, farm pesticide, and the animal waste produced by hog and poultry farms. As the pollution problems of the source of our drinking water, such as the river, become increasingly worrisome, people lose their confidence in the quality of their drinking water provided by the water company. Furthermore, people's anxiety about the quality of their drinking water is further aggravated by the fact that the conditions of the water supplying pipes and reservoirs are often found to be unsatisfactory. Accordingly, a variety of water-treating devices, such as water-filtering devices, water purifying devices, water softening devices, etc., have become ubiquitous in offices, homes, factories, schools, churches, and so forth. The conventional activated carbon filtration system of drinking water is effective in improving the quality of the drinking water. Nevertheless, the conventional activated carbon filtration system for drinking water is defective in design. The shortcomings inherent in the conventional drinking machines are described explicitly hereinafter.

In the conventional art technology, one of the conventional drinking water purification systems is the water filter device constituted by various water purifying elements, such as cotton filters, P.P. filters, CUNO type filters, for absorbing or removing various impurities and invisible particles in water.

Referring to FIG. 1, a filter device A2 comprises a housing A21 and a filter A22 such as a cotton filter, P.P filter or CUNO type filter. The housing A21 enables water flowing through the filter A22 therein. The filter A22 blocks off various impurities, including suspended solids and organic particles. After operating for a period of time, the fine pores of the filter A22 are gradually clogged by such suspended solids and organic particles. Therefore, ordinary pressurized water fails to penetrate the plugged pores and only water under increased pressure can pass through the clogged filter A22. At that moment, the filter is not only ineffective for purifying water but also provides an excellent environment for bacteria and fungi to grow. Such overused and clogged purifying elements would contaminate the water passing through the purification systems instead of purifying it.

Another common drinking water purifying device is constituted by activated carbon filter B4, as shown in FIG. 2, for removing the poison contents in the water, such as the pesticide pollution of water sources near agricultural areas.

However, the activated carbon filter has a service life, i.e. the activated carbon filter will become ineffective after filtering a certain volume of water, such as 1500 gallons. The service life is usually indicated by the manufacturer in its operation menu. Therefore, the activated carbon filter 4 would gradually become ineffective after a certain period of operation time. Finally, the ineffective activated carbon filter may form an excellent environment for bacteria, fungi and germs.

Accordingly, purifying elements are generally replaced (or backwashed) after a predetermined period of time of use without knowing the actual condition of the purifying elements. In many cases, overused purifying elements are not replaced or backwashed in time, so a consumer may unknowingly drink the poor quality water produced by such an ineffective water purification system.

Nowadays, the most popular and effective drinking water purifying element is the reverse osmosis membrane, which is so arranged as to form a parallel tangent plane with the flowing direction of the water. As the water is forced under pressure against the reverse osmosis filtration membrane, by means of a manual operation, a switch valve is used to increase the speed and the flow of the water passing through the reverse osmosis filtration element. Some water may pass through the reverse osmosis filtration element in a vertical angle instead of a parallel manner in order to filter out salts and other micro impurities.

Referring to FIG. 3, a most common reverse osmosis purification system is illustrated, which comprises a water pressure pump C1, an impurity filter device C2, a reverse osmosis filtration element C3, and an activated carbon filter C4. The impurity filter device C2 is used to pre-purify the water from tap or other water sources before feeding to the reverse osmosis filtration element C3 in order to prolong the service life of the relatively expensive reverse osmosis filtration element C3. The best number and style of the impurity filter device C2 to be installed depends on the water quality and the amount of suspended impurities and organic particles in water. The activated carbon filter C4 can be installed before or after the reverse osmosis filtration element C3 for removing any poison content in water.

The mesh of the reverse osmosis membrane of the reverse osmosis filtration element C3 are very tiny that the diameter of each reverse osmosis membrane mesh is very small, ex. 0.00000001 cm. The water pressure pump C1 is used to provide pressurized water (80 psi to 100 psi) in order to penetrate the reverse osmosis membrane. When the pre-purified water is pumped from the impurity filter device C2 through the reverse osmosis filtration element C3, the reverse osmosis membrane can isolate clean water molecules to obtain purified drinking water, wherein the highly concentrated waste water is drained off or collected for other cleaning purposes.

However, as mentioned above, purifying elements of the filter device and the activated carbon of the activated carbon filter are generally replaced after a predetermined period of time of use without one knowing the actual conditions of the purifying elements. Besides, the reverse osmosis filtration element must also be washed and cleaned periodically according to a specific cleaning schedule suggested by the manufacturer. In order to prolong the service life of the reverse osmosis filtration element, the impurities deposited in the reverse osmosis filtration element must be removed so as to prevent them from becoming hardened and clogging the reverse osmosis filtration element. It happens from time to time that the cleaning schedule of the reverse osmosis filtration element of the reverse osmosis purification system is unintentionally disregarded or overlooked. Furthermore, the chore of cleaning the reverse osmosis filtration element is not a task that people enjoy to do. It is an irresistible trend of the modem age that the consumers prefer an automated appliance rather than a manually operated appliance.

The reverse osmosis filtration element of the reverse osmosis purification system of drinking water mentioned above is capable of filtering out the impurities, such as unwanted suspended particles, the chlorine molecules, the pesticides, various organic matters, heavy metals, and the organic compound such as chloroform which is a carcinogen. In addition, the reverse osmosis filtration element is capable of deodorizing the water. If such impurities as mentioned above are allowed to accumulate in the reverse osmosis filtration element, its filtering effect will become seriously undetermined. Bacteria and fungi can grow and flourish on the accumulated impurities. Thereby, a potential health hazard is brought about to the users of the reverse osmosis purification system.

Moreover, if the drinking water purification system is used less often, the service life of the reverse osmosis membrane will be prolonged accordingly. Therefore, the scheduled maintenance work of the drinking water purification system is likely to be delayed or even skipped. The quality of operating performance of the drinking water purification system is often compromised by the lack of routine maintenance work of the drinking water purification system.

SUMMARY OF THE PRESENT INVENTION

The primary object of the present invention to provide a monitoring process for a drinking water purification system for monitoring the effectiveness thereof, warning of an undesirable condition thereof if such condition persists, and stopping unclean water from coming out of the drinking water purification system to protect the unaware consumers.

Another object of the present invention is to provide a monitoring process for a drinking water purification system having a reverse osmosis filtration element, which comprises a step of automatically ceasing the supply of drinking water from the drinking water purification system and providing reverse water flow to periodically wash and clean the impurities deposited in the reverse osmosis filtration element of the drinking water purification system.

It is still another object of the present invention to provide a monitoring device for a drinking water purification system, which is capable of automatically monitoring the quality of the drinking water produced by the drinking water purification system, advancing information signals when the output water quality is below a predetermined standard so as to warn the users of the timing of replacing disabled activated carbon filter of the system, and ceasing the supply of water from the drinking water purification system once the output drinking water is below the predetermined standard condition, so that the highest quality of the drinking water so made can be ensured.

It is still another object of the present invention to provide a monitoring device for a drinking water purification system having a reverse osmosis filtration element, which is capable of periodically and automatically ceasing the supply of drinking water and, at the same time, washing and cleaning the reverse osmosis filtration element by providing reverse water flow through the reverse osmosis filtration element so as to ensure drinking water quality and to protect the reverse osmosis filtration element.

It is still another object the present invention to provide a monitoring device for a drinking water purification system having a reverse osmosis filtration element, which is capable of automatically ceasing the supply of drinking water of the purification system when the PPM (parts per million) value of the drinking water and/or the service life of the reverse osmosis membranes are not in conformity with the safety standard, so as to ensure that drinking water produced by the drinking water purification system has the highest quality.

It is still another object the present invention to provide a monitoring device for a drinking water purification system having a pre-purifying filter device, which is capable of automatically ceasing the drinking water supply of the drinking water purification system when the service life of the water purifying elements, such as cotton filters, P.P. filters and CUNO filters, are not in conformity with the safety standards. It is processed by detecting the decrease of the output water pressure or the pressure difference between the input and output water pressure. Therefore, the highest quality of drinking water made by the drinking water purification system can be ensured.

It is still another object of the present invention to provide a monitoring device for a drinking water purification system having an activated carbon filter, which is capable of automatically ceasing the supply of drinking water from the water purification system when the activated carbon filter becomes ineffective and is not in conformity with the safety standard by computing and accumulating the total volume of the drinking water produced by the carbon filter, so as to ensure that the drinking water made by the drinking water purification system has the highest quality.

Accordingly, a monitoring process for a drinking water purification system comprises the steps of:

(1) inputting and formatting specific service life data of each of the filtration elements of the drinking water purification system into a microprocessor, each as a respective predetermined reference value;

(2) monitoring a functional condition of each of the filtration elements by detecting the quality of the drinking water produced by the filtration elements by means of a specific detecting means which is electrically connected to the microprocessor;

(3) generating a condition detecting value regarding the functional condition of each of the filtration elements by the detecting means and comparing the condition detecting value with the respective predetermined reference value regarding the service life of each of the filtration elements;

(4) sending a digital signal, which is readable by the microprocessor, to the microprocessor when the condition detecting value of one of the filtration elements approximates the respective predetermined reference value, indicating that the service life of the specific filtration element will soon be expired;

(5) sending an activation signal to a warning means which is electrically connected with the microprocessor and a warning information signal by the warning means to remind the user of the timing to replace the specific filtration element;

(6) ceasing the supply of drinking water supply from the drinking water purification system by a power switching means, which is electrically connected with the microprocessor and activated by the microprocessor of the monitoring device, when the warning means is activated to generate the warning information signal for a certain predetermined period of time, and (7) manually stopping the warning information signal of the warning means and manually restarting the drinking water purification system to produce drinking water again when the specific worn-out filtration element is replaced by a new one.

In addition, before step (5), the monitoring process further comprises an automatic RO cleaning step of temporarily ceasing the drinking water supply by means of the power switching means, which is activated by the microprocessor periodically when the drinking water purification system comprises a reverse osmosis filtration element, so as to backwash and clean the impurities clogging on the reverse osmosis filtration element of the drinking water purification system.

In addition, in the monitoring step (2), the detector is a PPM detecting sensor and the monitoring of the reverse osmosis filtration element is operated by detecting a PPM condition value of the outlet water from the reverse osmosis filtration element.

In addition, in the monitoring step (2), the monitoring of the reverse osmosis filtration element is operated by detecting a water pressure variation of the pre-purifying filtration element by using at least a water pressure sensor as the detector.

In addition, in the monitoring step (2), the detector is a flow detecting sensor installed at a water outlet of the reverse osmosis filtration element and the monitoring of the reverse osmosis filtration element is operated by detecting the reduction in outlet water flow amount from the reverse osmosis filtration element.

Furthermore, after the formatting step (3), the monitoring process further comprises an indicating step of notifying the users of the timing to replace the clogged reverse osmosis filtration element of the drinking water purification system and indicating a plurality of operational condition data which are sent from the microprocessor, including the current time, the recorded time of when the previous replacement of each filtration element was made, the PPM value of the drinking water made, the current water making volume value which shows the current total volume of drinking water produced by the water purification system, the total water making volume value which shows the total volume of drinking water produced by the purification system, and the mechanical breakdown condition that illustrates whether the purification system is normally functioning or mechanically out of order, wherein all the operational condition data are stored in the microprocessor.

Furthermore, in the ceasing step (6), the ceasing of the drinking water supply is operated by cutting off the electrical power of a water pressure pump of the water purification system in order to stop the pumping of water.

Alternatively, in the ceasing step (6), the ceasing of the drinking water supply can also be operated by shutting off an electromagnetic gate installed in a water inlet or outlet of the system.

A monitoring device for a drinking water purification system having a predetermined number of filtration elements comprises a microprocessor, a LCD indicator circuitry, a detecting means, a warning means, and a power switching means.

The microprocessor controls the operations of the monitoring device and shares a power source with the drinking water purification system. A total water making volume value, that is the total water volume of drinking water made by each filtration element of the drinking water purification system is formatted and input into the microprocessor as a predetermined reference value.

The LCD indicator circuitry is electrically connected to the microprocessor for notifying the users of the timing for replacing the specific filtration elements of the drinking water purification system and indicating a plurality of operational conditions which are sent from the microprocessor.

The detecting means is electrically connected to the microprocessor for monitoring a functional condition of each filtration element by detecting the quality of the drinking water made by the filtration element. The detecting means analyses a related condition detecting value detected for determining the functional condition of each of the filtration elements. When variations reach respective predetermined reference values preset in the microprocessor, the detecting means will send a signal which is converted to a digital signal and transmitted to the microprocessor.

The warning means is electrically connected to the microprocessor for advancing at least a warning information signal to notify that it is the time for the user to replace a specific filtration element. The warning means is activated by the microprocessor of the monitoring device by sending a signal to the warning means when a condition detecting value is detected approximating to the predetermined reference value, so as to indicate that the service life of a specific filtration element is expired.

The power switching means is electrically connected to the microprocessor and activated by the microprocessor for ceasing supply of the drinking water from the drinking water purification system when the warning means is activated to generate the warning signal for a predetermined period of time. It means that one of the filtration elements of the drinking water purification system has become ineffective and the drinking water so made is not safe for human consumption. When the specific worn-out filtration element is replaced by a new one, the drinking water purification system is manually restarted and reactivated to produce drinking water again and the warning means is also manually operated to stop the warning information signal.

In accordance with the monitoring device for the drinking water purification system as disclosed above, the warning means comprises a sound generating circuitry that produces verbal or musical sound for warning consumers about the clogged condition of the water filtration elements.

The detecting means of the present invention comprises an inlet water pressure sensor and an outlet water pressure sensor respectively installed to a water inlet and a water outlet of a filtration element, so that the pressure between the outlet and inlet water pressure sensors can be detected for determining the clogging condition of the filtration element.

The detecting means of the present invention can also comprise a flowmeter device installed to a drinking water output of the respective filtration element of the drinking water purification system for computing and accumulating the total volume of the drinking water so made and generating the digital condition data.

The detecting means of the present invention further can also be a PPM sensor, such as a TDS sensor, installed in a water outlet of a reverse osmosis filtration element for detecting the PPM value of the drinking water for converting to a digital value, data which is sent to the microprocessor.

DETAILED DESCRIPTION OF THE PREFERRED EMBODIMENT

The present invention provides a monitoring process and device for a drinking water purification system which comprises a predetermined number of filtration elements.

Figure 3:
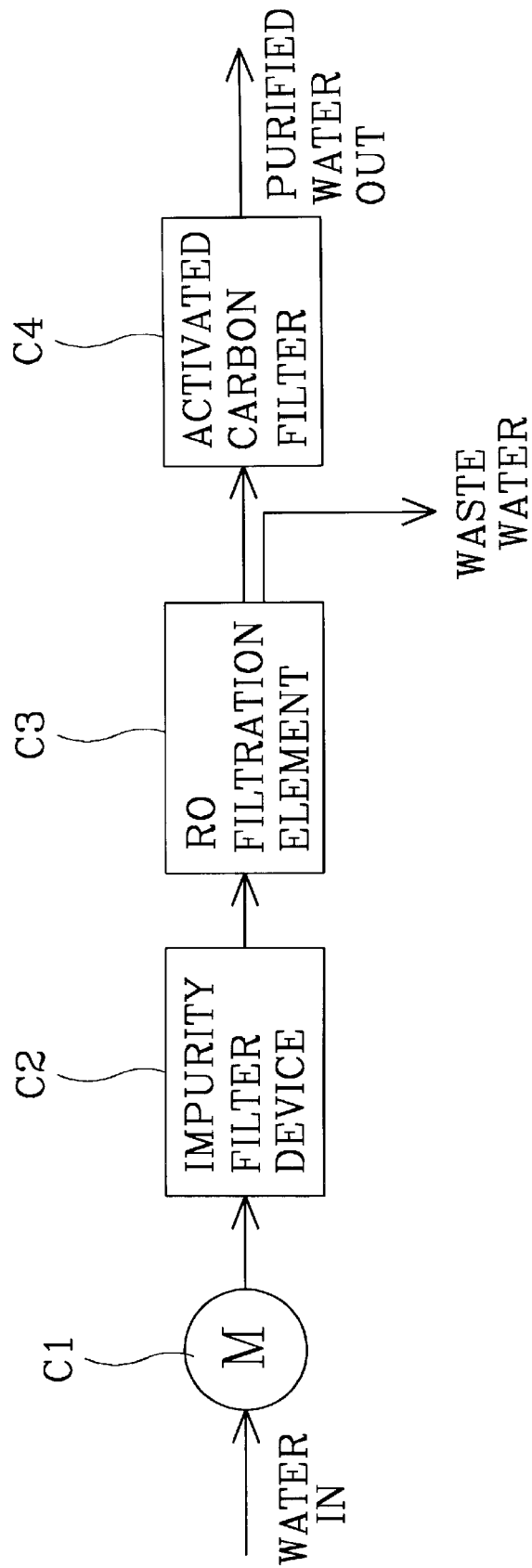
FIG. 3 is a block diagram of a drinking water filtration system having various filtration elements including an impurity filter device, a reverse osmosis filtration element and an activated carbon filter according to the present invention.

As shown in FIG. 3, a most common and effective drinking water purification system comprises a water pressure pump C1, an impurity filter device C2, a reverse osmosis filtration element C3, and an activated carbon filter C4.

Ordinary, water supply sources that supply tap water include water companies, wells, springs, and etc. The pressure pump C1 pressurizes the water entering the impurity filter device C2 which contains water impurity filtration elements such as cotton filters, P.P filters or CUNO filters for filtering suspended solids and removing various solid impurities and organic particles in water. The impurity filter device C2 is used to pre-purity the incoming water before feeding it to the reverse osmosis filtration element or membrane C3 in order to prolong the service life span of the relatively expensive reverse osmosis filtration element or membrane C3. The best number and style of the impurity filter devices C2 to be used depends on the water quality and the amount of suspended impurity and organic particles in raw water. Generally speaking, a combination of coarse impurity filters and fine impurity filters are used for the purpose of removing suspended solids and organic particles of various sizes.

The pre-purified water coming out from the impurity filter device C2 is fed to the reverse osmosis filtration element C3. Since the mesh of the reverse osmosis membrane C3 is very tiny, in which the diameter of each mesh of the reverse osmosis membrane is very small ex. 0.00000001 cm, the water pressure pump C1 is used to provide pressurized water of 80 psi to 100 psi in order to penetrate through the reverse osmosis filtration element or membrane. The reverse osmosis membrane can isolate clean water molecules so as to separate purified drinking water from highly concentrated waste water. The waste water is discharged for disposal or secondary uses such as washing floors and flushing toilets. The purified water is suitable for drinking.

The activated carbon filter C4 is installed before or after the reverse osmosis filtration element C3 for removing any poison content in the water. The purified water from the reverse osmosis filtration element C3 is further purified by passing through the activated carbon filter C4 which absorbs and removes toxic chemicals present in the water. The number of such activated carbon filters to be used depends on the amount of chemical toxins present in the raw water.

Figure 4:
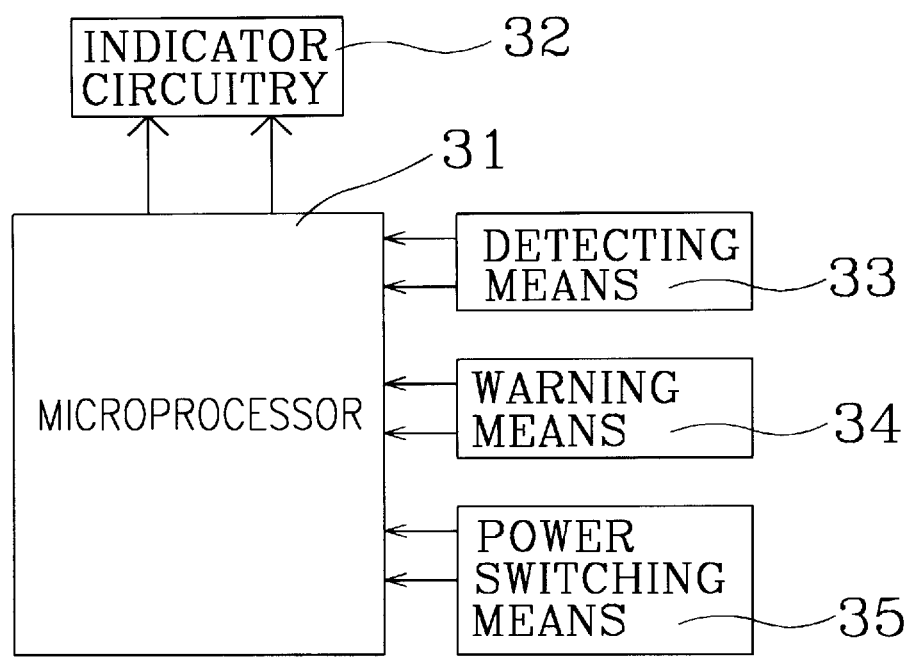
FIG. 4 is a flow chart of a monitoring device for a drinking water purification system of the present invention.

Referring to FIG. 4, it is a block diagram of the monitoring device of the present invention. The monitoring device of the present invention comprises a microprocessor 31, an LCD indictor circuitry 32 electrically connected to the microprocessor 31, a detecting means 33 electrically connected to the microprocessor 31, a warning means 34 electrically connected to the microprocessor 31, and a power switching means 35 electrically connected to the water pressure pump C1 and the microprocessor 31.

Operational signals from the detecting means 33, regarding a functional condition of each activated carbon filter detected concerning the quality of the drinking water made, is sent to the microprocessor 31. When the microprocessor 31 receives such signals from the detecting means 33, the microprocessor 31 will process respective responses by respectively sending corresponding signals to the warning means 34 and the power switching means 35 for activating them to process predetermined functions.

The microprocessor 31 controls the operation of the monitoring device and shares the power source of the drinking water purification system. A total water making volume value, that is a total water volume of drinking water made by the filtration elements of the drinking water purification system is formatted and input into the microprocessor 31 as a predetermined reference value or as digital standard reference data. A preferred embodiment of the present invention uses a monolithic chip microprocessor 31 such as a model number 8051 or 8052. The I/O memory of the microprocessor 31 is constituted by a monolithic chip. The programs stored in the microprocessor 31 control the entire operation of the monitoring device.

The LCD indicator circuitry 32 is electrically connected to the microprocessor 31 for notifying the users of the timing for replacing and disabling specific filtration elements of the system and indicating a plurality of operational condition data which is sent from the microprocessor 31, including a current time, a recorded time of when the previous replacement of each filtration element was made, a PPM value of the drinking water made, a current water making volume value that shows the current volume of drinking water produced by each of the filtration elements, a total water making volume value, that is the total volume of drinking water produced by each filtration element before it becomes ineffective, a mechanical breakdown condition that illustrates whether the purification system is normally functioning or mechanically out of order, etc. All the operational condition data is stored in the microprocessor 31.

The detecting means 33 comprises a filter detecting circuitry electrically connected to the microprocessor 31 for monitoring the functional condition of each filtration element by detecting the quality of the drinking water filtered through each filtration element. The detecting means 33 reads and analyses the respective condition detecting value by at least a detector for determining the functional condition of each filtration element. When any of the respective condition detecting values reaches a certain predetermined reference value preset in the microprocessor 31, the detecting means will send a signal which is converted to a digital signal and transmitted to the microprocessor 31.

The warning means 34 is electrically connected to the microprocessor 31 for advancing a warning information signal to notify that it is the time for the users to replace the respective filtration element. The warning means 34 is activated by the microprocessor 31 of the monitoring device by sending a signal thereto when the respective condition detecting value is detected approximating to the respective predetermined reference value, so as to indicate that the service life of the respective filtration element is expired.

The power switching means 35 is electrically connected to the microprocessor 31 and activated by the microprocessor 31 for ceasing supply of drinking water from the drinking water purification system when the warning means 34 is activated to generate the warning information signal for a predetermined period of time. It means that the respective filtration element of the drinking water purification system has become ineffective and the drinking water so made is not safe for human consumption.

When the respective worn-out filtration element is replaced by a new one, the drinking water purification system is manually restarted and reactivated to produce drinking water again followed by manually stopping of the warning information signal of the warning means.

In accordance with the monitoring device of the drinking water purification system as disclosed above, and as shown in FIGS. 5 to 10, the warning means 34 comprises a sound generating circuitry having a configuration that produces verbal or musical sound for warning consumers about a disabling condition of any of the water filtration elements. Of course, the sound generating circuitry 34 can be substituted with a usual lighting generating circuitry. Moreover, the warning means 34 can also comprise both a sound generating circuitry and a lighting generating circuitry so as to generate both warning sound and warning lighting.

The sound generating circuitry 34 comprises a sound circuit IC 341, a speaker driving circuit 342 and a speaker 343 all electrically connected, in which the sound circuit IC 341 stores a verbal or music sound track. The speaker driving circuit 342 broadcasts the stored verbal sound or music of the sound circuit IC 341 via the speaker 343.

Due to the different natures and configurations of the impurities filter device C2, the reverse osmosis filtration element C3 and the activated carbon filter C4 possible, various water quality determining methods can be applied to monitor the functional condition of each of the filtration elements. Such methods include monitoring of a water pressure difference between an inlet and an outlet of the impurity filter device C2 which may increase or decrease when the impurity filtration element C3 is clogged with impurities. The water pressure difference between the outlet and the inlet of the impurity filtration element may increase when the impurity filtration element of the impurity filter device C2 or the reverse osmosis filtration element C3 is ineffective. The varying PPM of the water discharged from the reverse osmosis filtration element C3 can indicate the drinking water quality and the filtering ability of the reverse osmosis filtration element C3. If the PPM of the water discharged from the reverse osmosis filtration element C3 exceeds 4 PPM, generally the reverse osmosis membrane of the reverse osmosis filtration element has become ineffective. Computing the total volume of the water filtered by the activated carbon filter C4 can also determine its filtering ability and service life. We can also detect the decrease of the water flow out of a filtration element when the filtration element is clogged, when the outlet water flow of the filtration element will decrease.

Figure 5:
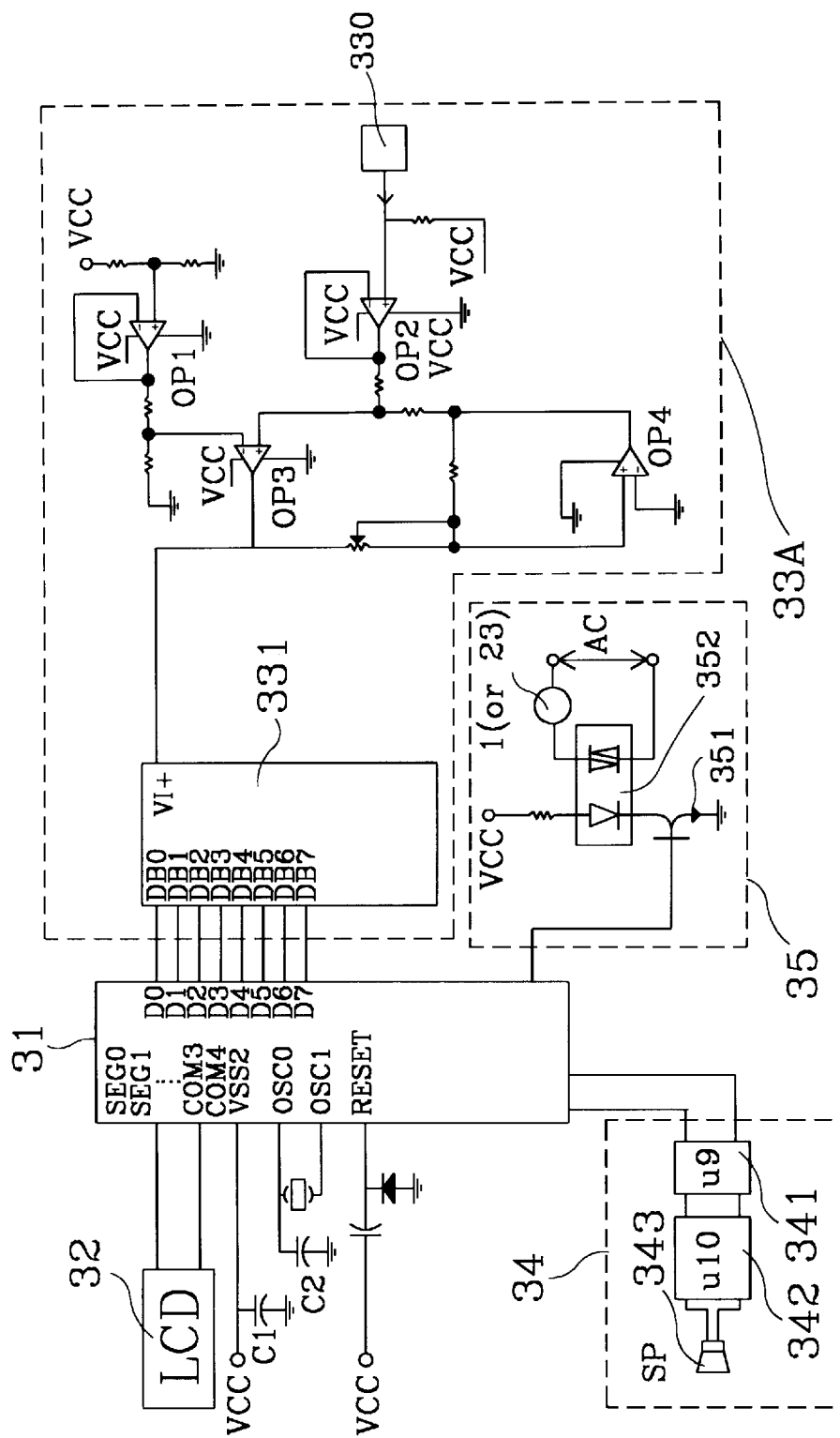
FIG. 5 is a circuit diagram of the monitoring device for a drinking water purification system, which has at least an impurity filter device according to the present invention.

In accordance with the impurity filter device C2, as shown in FIG. 5, the detecting means comprises an impurity filter detecting circuitry 33a which comprises a water pressure sensor 330 installed to a water inlet of the impurity filter device C2, a plurality of operational amplifiers OP1, OP2, OP3, and OP4 and an analog to digital converter 331 all electrically connected.

In this mode of the present invention, the pressure of the inlet water to the impurity filter device C2 is detected by the water pressure sensor 330 which generates a pressure condition detecting value which is readable by the operational amplifier OP2. When the impurity filtration element is clogged, the inlet water pressure rises. Therefore, when the condition detecting value detected by the operational OP2, regarding the inlet water pressure, rises to a predetermined reference value preset in the operational amplifier OP1, the clogged condition of the impurity filtration element of the impurity filter device C2 can be judged. In case the condition detecting value detected by the operational amplifier OP2 is larger than the predetermined reference value of the operational amplifier OP1, an analog signal is sent to the analog to digital converter 331 for converting the analog signal into a digital signal which is transmitted to the microprocessor 31. The microprocessor 31 will then activate the warning means 34 to advance the warning information signal to notify the users of the time to replace the ineffective impurity filter device C2.

Accordingly, when the pressure condition detecting value generated by the operational amplifier OP2 is larger than the predetermined reference value preset in the operational amplifier OP1, the microprocessor 31 activates the sound generating circuitry 34 to generate verbal or musical warning sound to notify the users that the impurity filtration element of the impurity filter device C2 is clogged and should be replaced. If such clogged condition of the impurity filter device C2 remains unchanged for a predetermined period of time, the microprocessor 31 is programmed to send an activated signal to activate the power switching means to cease the supply of drinking water from the impurity filtration system. Under such circumstances, users of the impurity filtration system are unable to obtain drinking water from the system. Therefore, the drinking water quality is assured.

Figure 6:
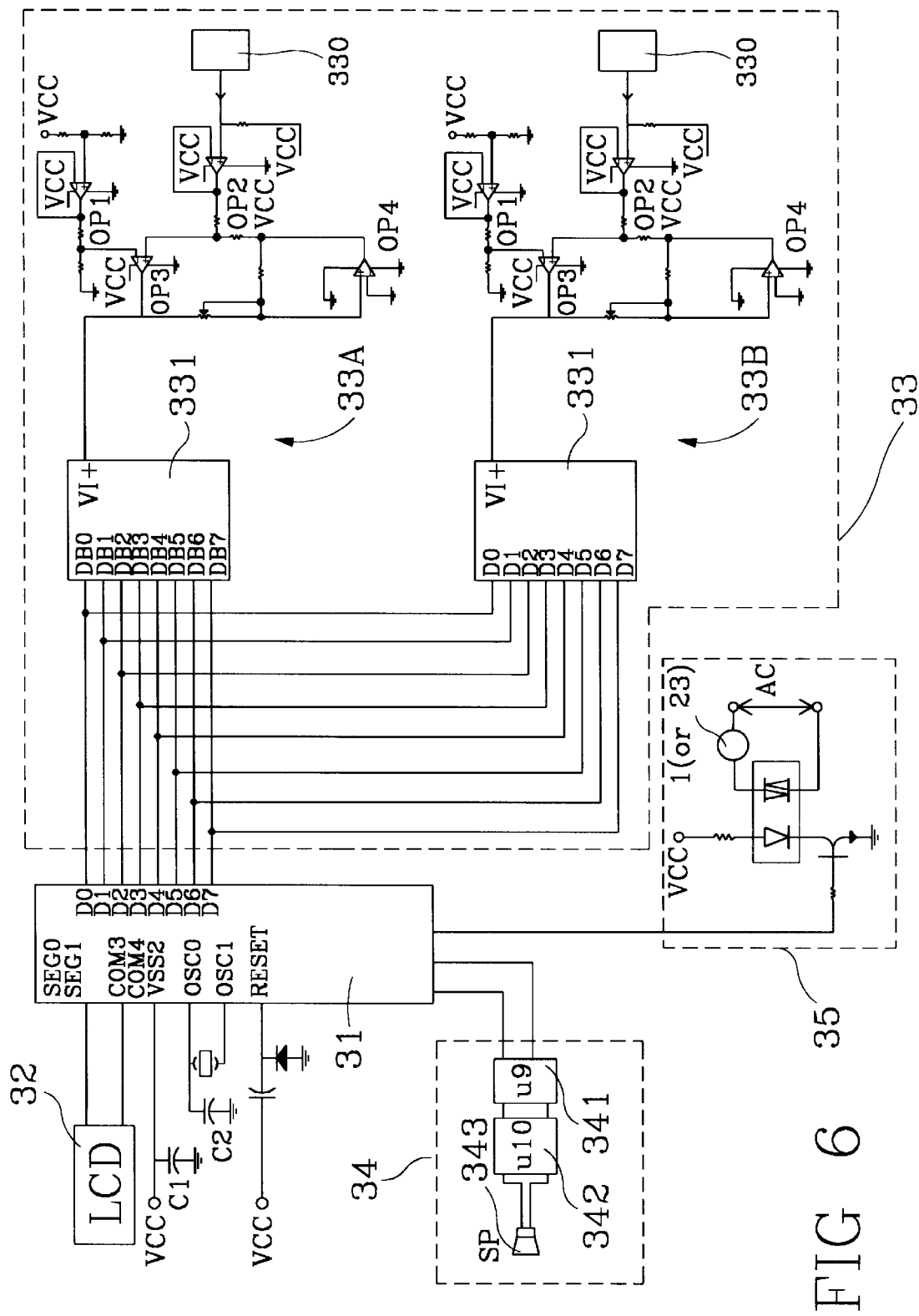
FIG. 6 is a circuit diagram of an alternative mode of the monitoring device for a drinking water purification system, having at least an impurity filter device according to the present invention.

Referring to FIG. 6, an alternative mode of the monitoring device is illustrated. The monitoring device of this alliterative mode comprises a microprocessor 31, an LCD indicator circuitry 32, a detecting means 33 which comprises two identical impurity filter detecting circuitries 33a, 33b, a warning means 34, and a power switching means 35. This alternative mode is different from the previous embodiment, shown in FIG. 5, by utilizing of additional filter detecting circuitry 33b which also comprises a plurality of operational amplifiers OP1, OP2, OP3, and OP4, an analog to digital converter 331, and a conventional water pressure sensor 330 electrically connected. A water pressure sensor 330 is installed in a water outlet of the impurity filter device C2 and connected to the operational amplifier OP2 of the additional impurity filter detecting circuitry 33b. In this mode, the clogged condition of the filtration element of the impurity filter device C2 is determined by detecting of the differential pressure between the inlet water pressure and the outlet water pressure instead of the variation in the inlet water pressure as mentioned in the above first mode (as shown in FIG. 5).

Figure 7:
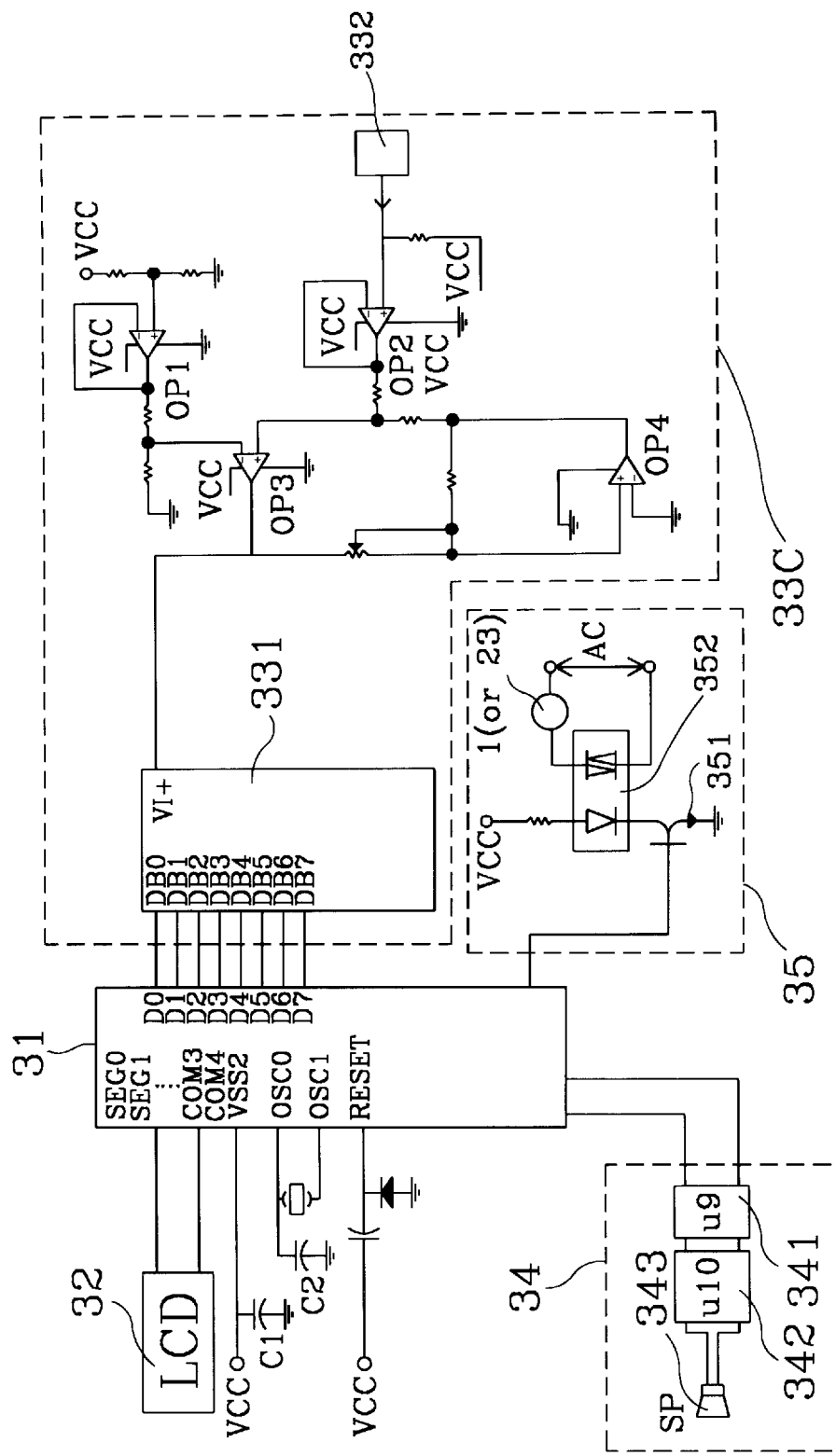
FIG. 7 is a circuit diagram of another alternative mode of the monitoring device for a drinking water purification system, having at least an impurity filter device according to the present invention.

Referring to FIG. 7, another alternative mode of the present invention is illustrated. The monitoring device of this second alternative mode comprises a microprocessor 31, an LCD indicator circuitry 32, a detecting means 33 comprising a filter detecting circuitry 33c, a warning means 34, and a power switching means 35. This alternative mode is different from the previous first mode, as shown in FIG. 5, in that the filter detecting circuitry 33c, a water flow detecting sensor 332 is installed in the water outlet of the impurity filter device C2 and connected to the operational amplifier OP2 instead of the pressure detecting sensor 330. In this mode, the clogged condition of the impurity filtration element is detected by the reduction of the outlet water flow amount instead of the variation in the inlet water pressure as disclosed in the previous first mode (as shown in FIG. 5).

If the impurity filtration system only contains the impurity filtration filter C2 (without incorporating the reverse osmosis filtration element C3 or the pressure pump C1), an electromagnetic gate 23 which is electrically connected with the power switching means 35 is installed in the water outlet or inlet of the impurity filter device C2, as shown in FIGS. 1, 5, 6, and 7.

As shown in FIGS. 6 to 7, the power switching means 35 of any one of the above three modes comprises a transistor 351 and a photoelectric driving power transistor 352 electrically connected with the transistor 351. The programmed microprocessor 31 will send a signal to activate the transistor 351 to conduct electricity when the warning means 34 is activated to generate warning sound for a certain predetermined period of time. The photoelectric driving power transistor 352 activates shut-off of the electromagnetic gate 23 when the drinking water purification system only includes the impurity filter device C2 or cuts off electrical power to the water pressure pump C1.

Figure 8:
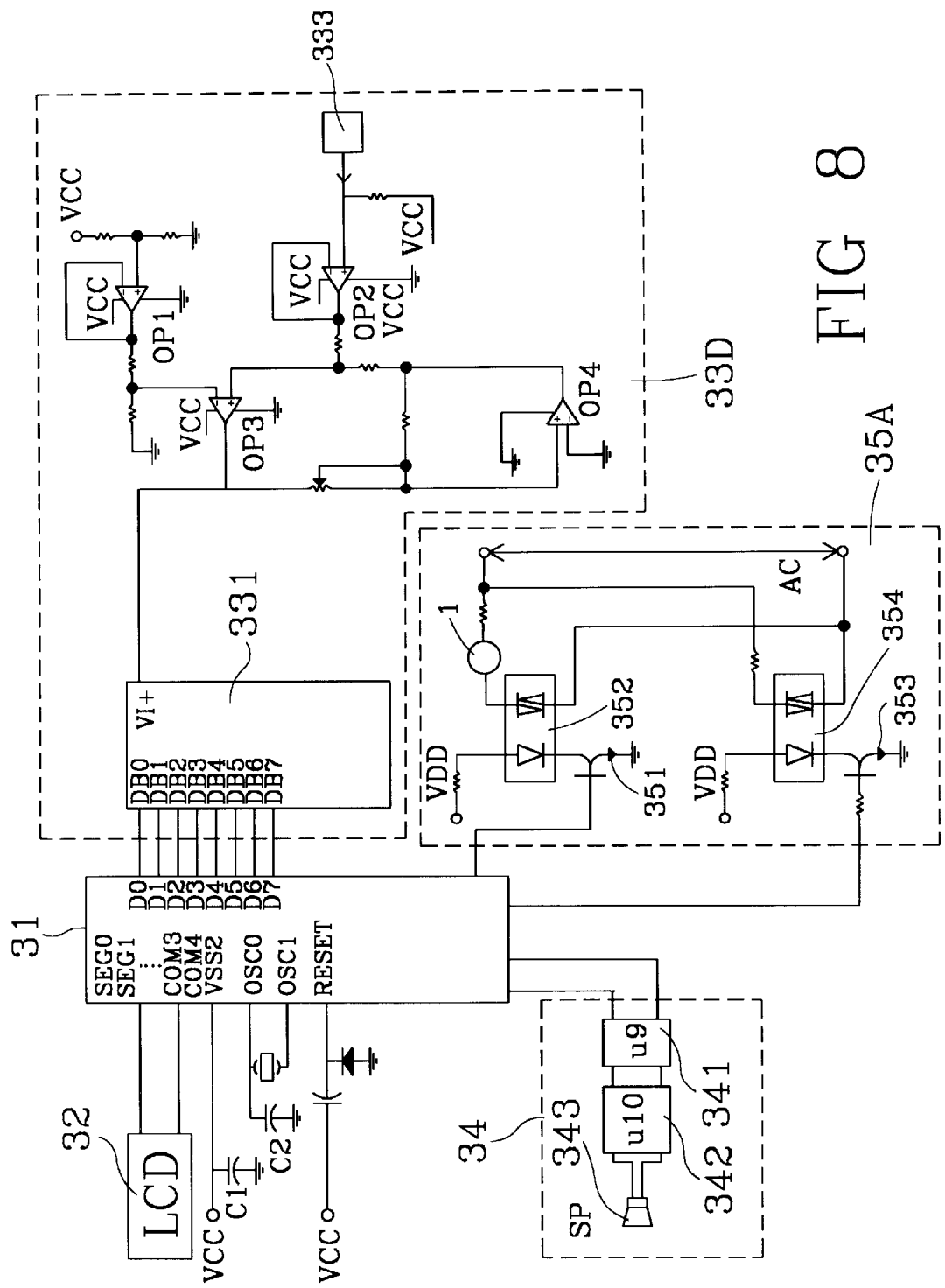
FIG. 8 is a circuit diagram of the monitoring device for a drinking water purification system having at least a reverse osmosis filtration element according to the present invention.
Figure 9:
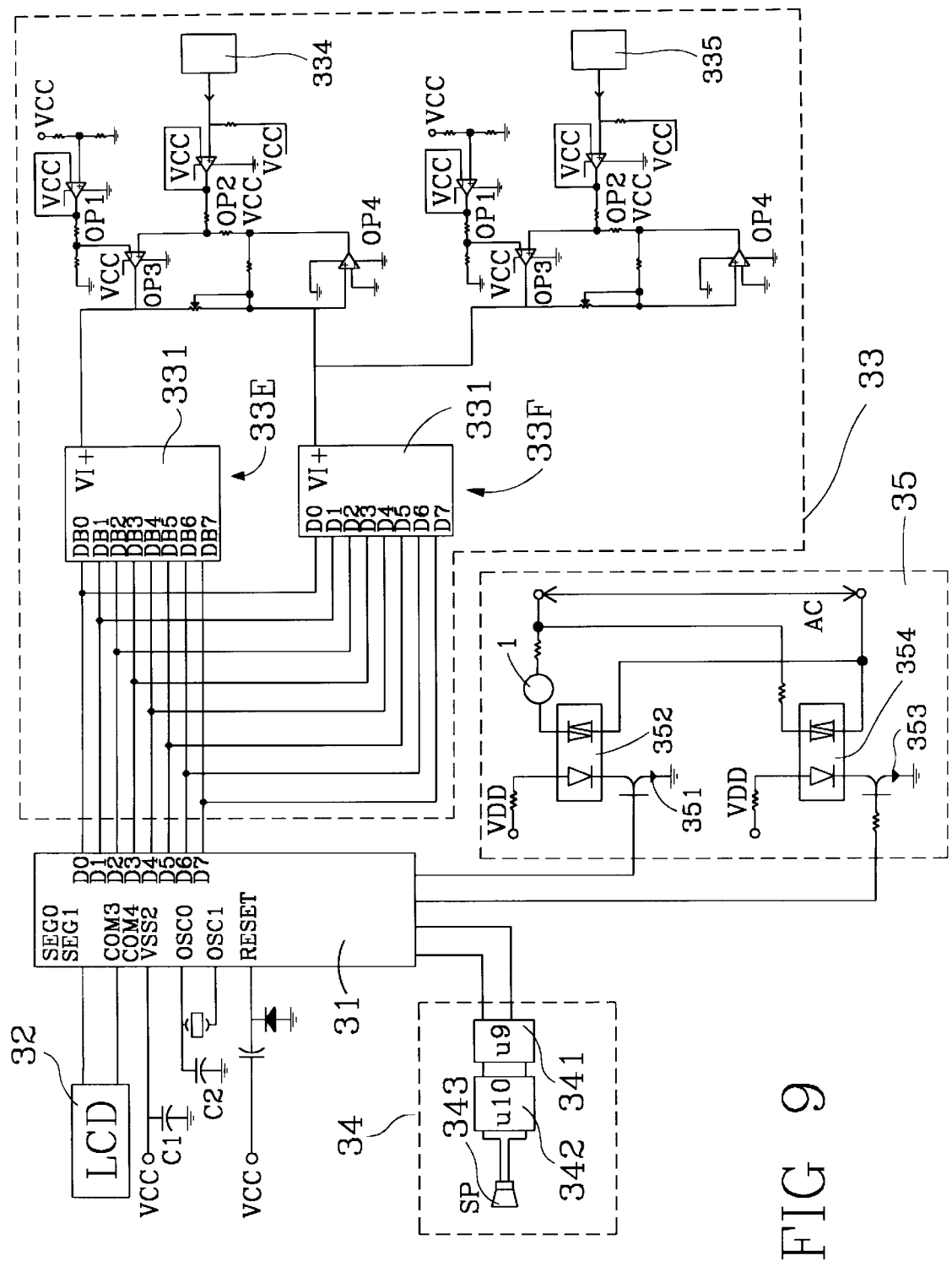
FIG. 9 is a circuit diagram of an alternative mode of the monitoring device for a drinking water purification system, having at least a reverse osmosis filtration according to the present invention.

In accordance with the reverse osmosis filtration element C3, as shown in FIG. 8, the detecting means 33 comprises a reverse osmosis detecting circuitry 33d which also comprises a plurality of operational amplifiers OP1, OP2, OP3, OP4, an analog to digital converter 331, and a PPM detecting sensor 333, such as TDS. The PPM detecting sensor 333 is installed in a water outlet of the reverse osmosis filtration element C3.

When the reverse osmosis filtration element C3 fails to normally function and the PPM value detected by the PPM detecting sensor 333 is bigger than 4 PPM, the reverse osmosis filtration element C3 should be judged as ineffective and the drinking water so made is not safe for human consumption. Therefore, when the PPM condition detected by a signal detected by the PPM detecting sensor 333 and read by the operational amplifier OP2, regarding the outlet water PPM, rises to a predetermined PPM reference value preset in the operational amplifier OP1, which is the voltage value detected during the clogged condition of the reverse osmosis filtration element C3, an activating signal is sent. Therefore, in case the PPM condition detecting value generated by the operational amplifier OP2 is larger than the predetermined PPM reference value of the operational amplifier OP1, an analog signal is sent to the analog to digital converter 331 for conversion into a digital signal which is transmitted to the microprocessor 31. The microprocessor 31 will then send an activating signal to activate the warning means 34 to advance the sound generating circuitry 34 to generate verbal or musical warning sound.

The power switching means 35 comprises a power cutoff circuitry 35a which comprises two transistors 351, 353 and two photoelectric driving power transistors 352, 354 electrically connected. The first transistor 351 is continuously activated to conduct electricity according to an activating signal sent from the microprocessor 31. The first photoelectric driving power transistor 352 activates the water pressure pump C1 (as shown in FIG. 4) to pump water flowing through the filtration elements to produce purified drinking water. Periodically, the microprocessor 31 is programmed to send another activating signal to activate the second transistor 353 to conduct electricity that causes the second photoelectric driving power transistor 354 to activate the water pressure pump C1 for automatically backwashing and cleaning the reverse osmosis membrane of the reverse osmosis filtration element C3 automatically. Therefore, the water quality is assured and the reverse osmosis membrane of the reverse osmosis filtration element C3 is protected from undesirable water pressure.

When the warning means 34 generates the warning information sound signal for a certain predetermined period of time, the microprocessor 31 is programmed to send a ceasing signal to activate the first transistor 351 to stop the water pressure pump C1 for cutting off the drinking water supply of the whole drinking water purification system. At that moment, the reverse osmosis filtration element will not produce drinking water any more until the user replaces the worn-out filtration element and manually reactivates the water pressure pump C1 to restart the system. Therefore, the water quality can be assured.

When the reverse osmosis membrane of the reverse osmosis filtration element C3 is clogged, the pressure difference between the inlet water pressure and the outlet water pressure of the reverse osmosis filtration element C3 varies. Therefore, one can detect the inlet water pressure and the outlet water pressure of the reverse osmosis filtration element C3 to judge whether the reverse osmosis filtration element C3 is clogged and has become ineffective. Referring to FIG. 4, an alternative mode of the detecting means 33 for the reverse osmosis filtration element is illustrated. The detecting means 33 comprises two identical reverse osmosis detecting circuitries 33e and 33f and two detectors 334, 335.

Each of the reverse osmosis detecting circuitries 33e and 33f comprises a plurality of operational amplifiers OP1, OP2, OP3, OP4, and an analog to digital converter. The two detectors 334, 335 are two water pressure detecting sensors electrically connected with the two first operational amplifiers OP2 of the two reverse osmosis detecting circuitries 33e, 33f respectively. The first water pressure detecting sensor 334 is installed in the water inlet of the reverse osmosis filtration element C3 and is connected to the operational amplifier OP2 of the reverse osmosis detecting circuitry 33e. The second water pressure detecting sensor 335 is installed in the water outlet of the reverse osmosis filtration element C3 and connected to the operational amplifier OP2 of the reverse osmosis detecting circuitry 33f. In this mode, the clogged condition of the reverse osmosis filtration element C3 can be detected and determined by the differential pressure between the inlet and outlet water pressure.

Figure 10:
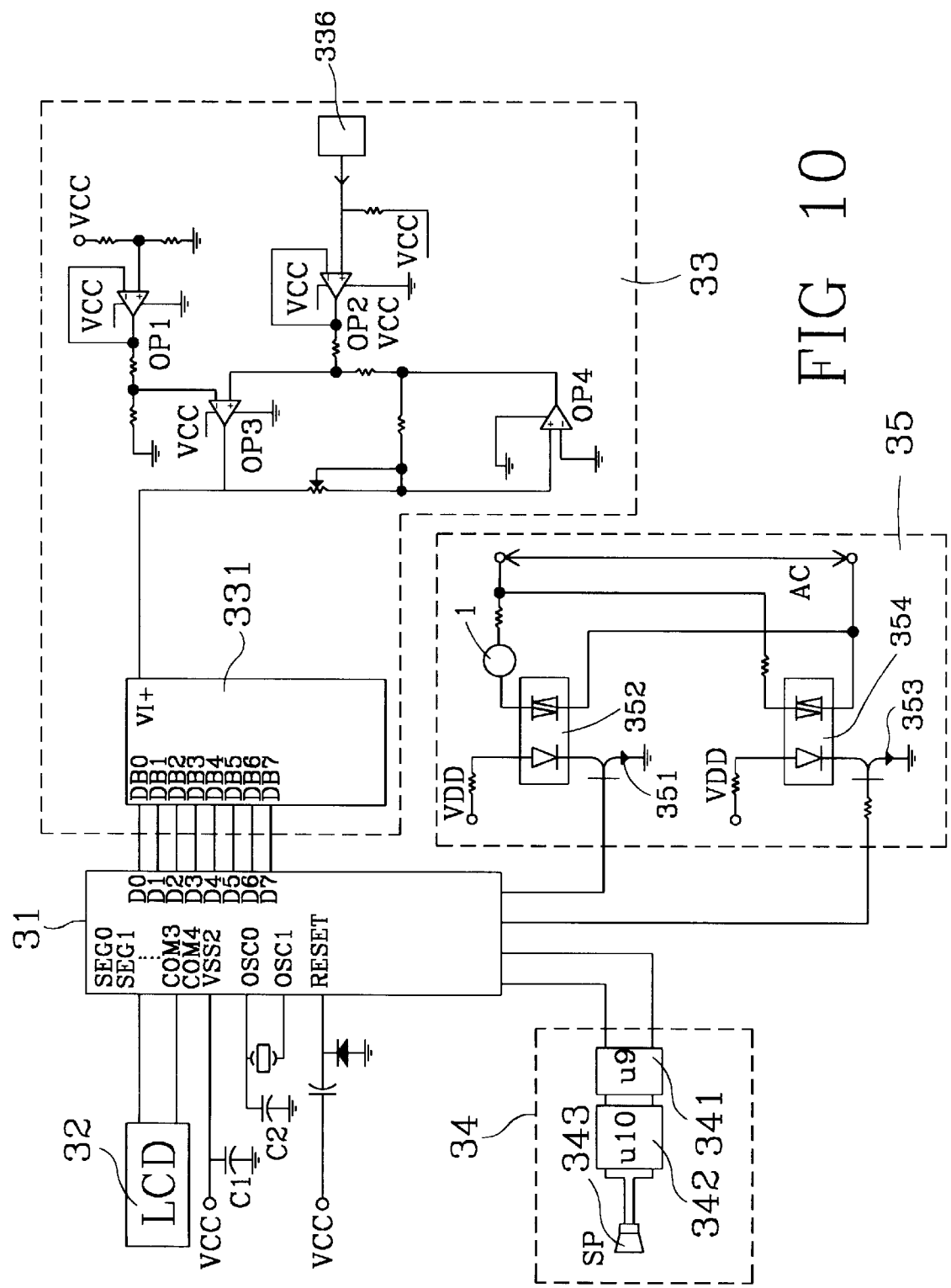
FIG. 10 is a circuit diagram of another alternative mode of the monitoring device for a drinking water purification system, having at least a reverse osmosis filtration according to the present invention.

Referring to FIG. 10, another alternative mode of the reverse osmosis filtration element C3 is illustrated. The difference between this alternative mode and the previous mode as shown in FIG. 3 is that a flow detecting sensor 336 is installed in the water outlet of the reverse osmosis filtration element C3 and connected to the operational amplifier OP2, instead of the PPM detecting sensor 333. In this mode, the clogged condition of the reverse osmosis filtration element C3 can be detected and determined by the reduction in water outlet flow amount instead of the variation in the PPM value of the drinking water produced by the reverse osmosis filtration element C3.

Figure 11:
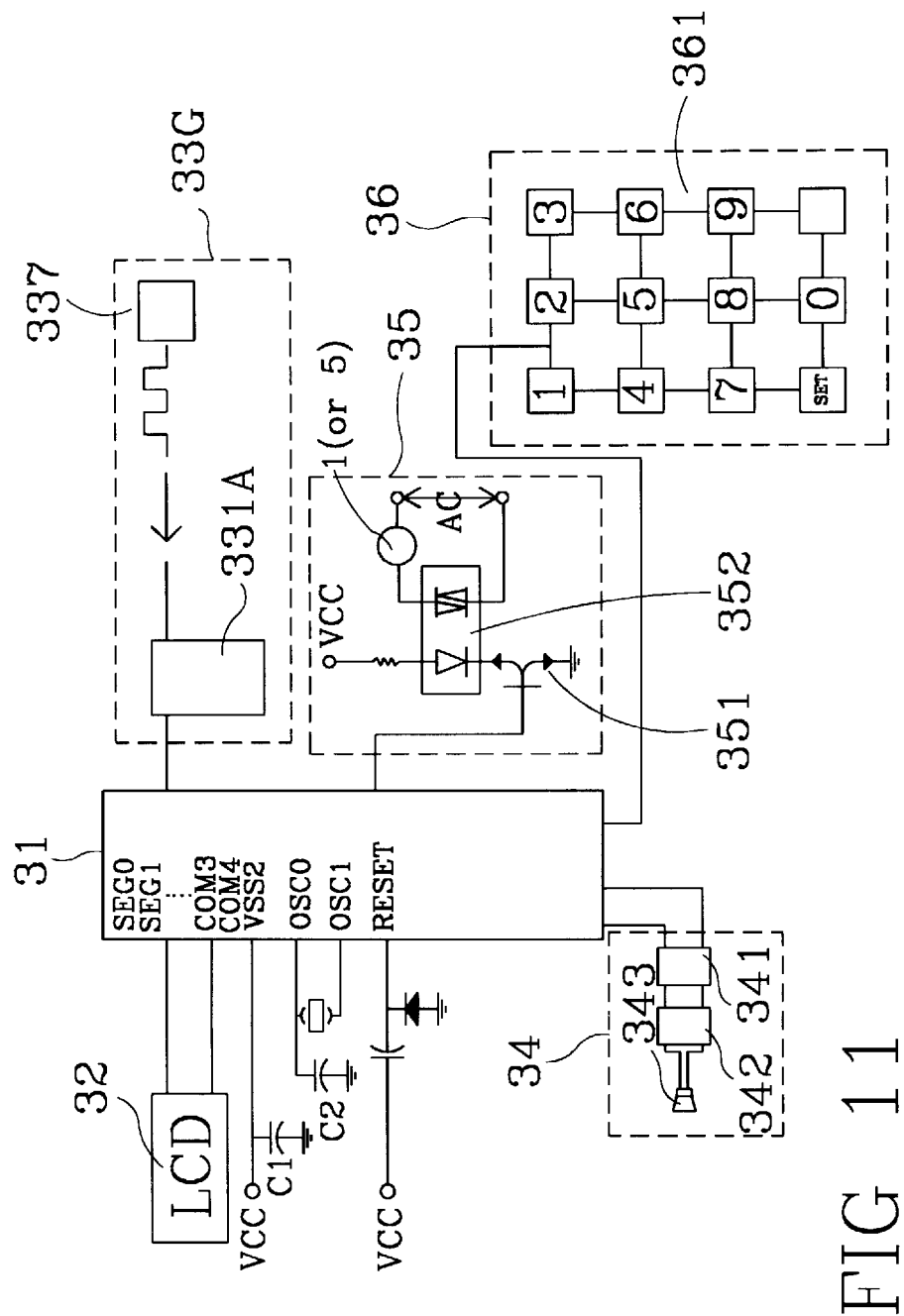
FIG. 11 is a circuit diagram of the monitoring device for a drinking water purification system, having at least an activated carbon filter according to the present invention.

In accordance with the monitoring device of the activated carbon filtration system of the present invention, as shown in FIG. 11, the detecting means 30 comprises an activated carbon filter detecting circuitry 33g which comprises a calculator 331a and a water flowmeter 337 which is installed in a water outlet of the activated carbon filter 4. The water flowmeter 337 will generate a series of corresponding pulse waves which are transmitted to the calculator 331a when the drinking water produced from the activated carbon filter is flowing therethrough, for computing the amount of drinking water flowing out from the activated carbon filter C4. The calculator 331a receives and accumulates such pulse waves to achieve the current water making volume value as a condition detecting value that illustrates the current volume of drinking water made by the activated carbon filter C4. When the condition detecting value exceeds the predetermined reference value which represents the service life of the activated carbon filter C4, that is the total volume of drinking water that can be made by the activated carbon filter C4 until it becomes ineffective, a digital signal will be sent from the carbon filter detecting circuitry 33g to the microprocessor 31 to activate the microprocessor 31 to send out an activating signal to the sound generating circuitry 34 which will generate a warning verbal or music sound to notify the user to replace the activated carbon filter in order to ensure the drinking water quality.

Figure 1:
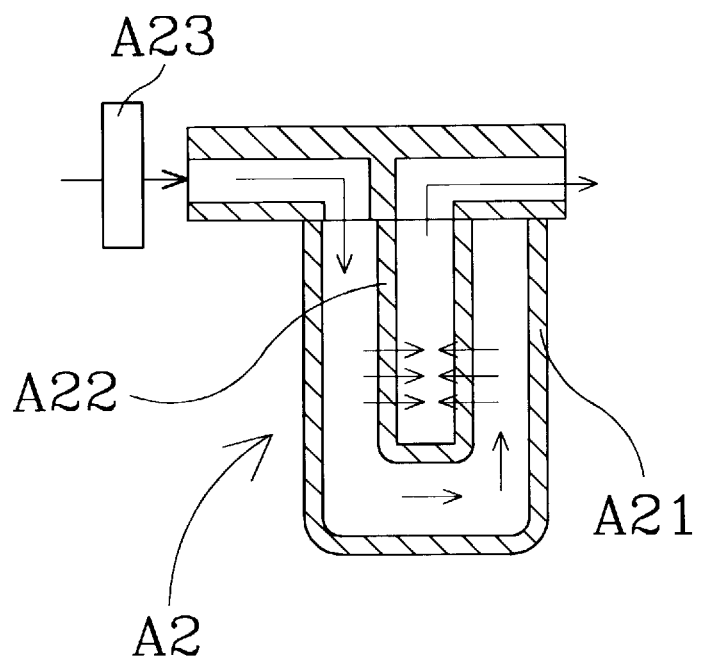
FIG. 1 is a schematic diagram illustrating the water flow direction in an impurity filter device.
Figure 2:
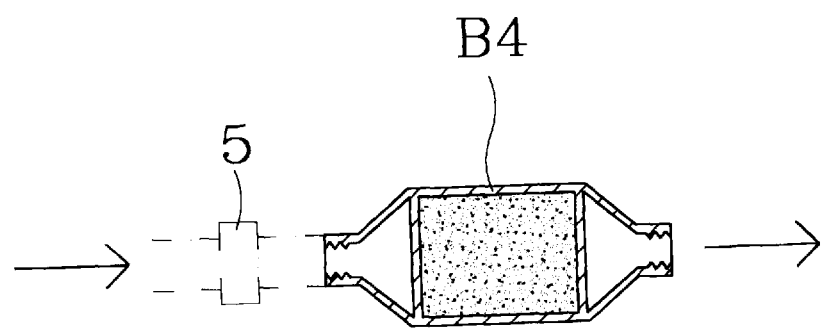
FIG. 2 is a schematic diagram illustrating the water flow direction in an activated carbon filter.

When the drinking water purification system only comprises the activated carbon filter 4 (i.e. without the reverse osmosis filtration filter C3 or pressure pump C1), an electromagnetic gate 5 is installed in a duct connecting with the outlet or inlet of the activated carbon filter 4. The electromagnetic gate 5 is electrically connected with the power switching means 35, as shown in FIGS. 2 and 11.

As shown in FIG. 11, the power switching means 35 comprises a transistor 351 and a photoelectric driving power transistor 352 electrically connected. The microprocessor 31 will send an activated signal to the power switching means 35 when the warning means 34 is activated to generate warning sound for a certain predetermined period of time. When the transistor 351 is activated to conduct electricity by the activated signal sent from the microprocessor 31, the photoelectric driving power transistor 352 activates the electromagnetic gate 23 to shut off the water flow through the activated carbon filter C4 if the drinking water purification system only includes the activated carbon filter C4, or cuts off electrical power to the water pressure pump C1.

Since the service lives of various filtration elements may be vaned due to their different sizes, the monitoring device of the present invention can further comprise an information input circuitry 36 which is electrically connected to the microprocessor 31. Through the information input circuitry 36, the users can format and store the specific service life of a specific activated carbon filter into the microprocessor 31 as the standard reference value.

As shown in FIG. 11, the information input circuitry 36 comprises an input keyboard 361 which has a plurality of numeral keys from 0 to 9, a "SET" key and a "CLEAR" key. If the "CLEAR" key is pressed, the previous standard reference value regarding the service life of the activated carbon filter 4 is detected. Then, a new service life data can be keyed in by means of the numeral keys to set up a new standard reference value. Finally, such new standard reference value can be saved by pressing the "SET" key.

The monitoring process of a drinking water purification system is further described hereinafter.

The monitoring process for a drinking water purification system having at least filtration element comprises the steps of:

(1) inputting and formatting specific service life data for each of the filtration elements of the drinking water purification system into a microprocessor as respective predetermined reference values;

(2) monitoring a functional condition of each of the filtration elements by detecting the quality of the drinking water produced by the specific filtration element by means of a specific detecting means which is electrically connected to the microprocessor;

(3) generating a condition detecting value regarding the functional condition of each of the filtration elements by the detecting means and comparing the condition detecting value with the respective predetermined reference value regarding the service life of each of the filtration elements;

(4) sending a digital signal, which is readable by the microprocessor, to the microprocessor when the condition detecting value of one of the filtration elements is detected approximating to the respective predetermined reference value, indicating that the service life of the respective filtration element is expired;

(5) sending an activation signal to a warning means which is electrically connected with the microprocessor and a warning information signal by the warning means to remind the user of the time to replace the specific filtration element;

(6) ceasing the supply of drinking water supply from the drinking water purification system by a power switching means, which is electrically connected with the microprocessor and activated by the microprocessor of the monitoring device, when the warning means is activated to generate the warning information signal for a certain predetermined period of time; and (7) manually stopping the warning information signal of the warning means and manually restarting the drinking water purification system to produce drinking water again when the specific worn-out filtration element is replaced by a new one.

In addition, before step (5), the monitoring process further comprises an automatic RO cleaning step of temporarily ceasing the drinking water supply by means of the power switching means, which is activated by the microprocessor periodically when the drinking water purification system comprises a reverse osmosis filtration element, so as to backwash and clean the impurities clogged on the reverse osmosis filtration element of the drinking water purification system.

In addition, in the monitoring step (2), the detector is a PPM detecting sensor and the monitoring of the reverse osmosis filtration element is operated by detecting a PPM condition value of the outlet water from the reverse osmosis filtration element.

In addition, in the monitoring step (2), the monitoring of the reverse osmosis filtration element is operated by detecting a water pressure variation of the filtration element by using at least a water pressure sensor as the detector.

In addition, in the monitoring step (2), the detector is a flow detecting sensor installed in a water outlet of the reverse osmosis filtration element and the monitoring of the reverse osmosis filtration element is operated by detecting the reduction in outlet water flow amount from the reverse osmosis filtration element.

Furthermore, after the formatting step (3), the monitoring process further comprises an indicating step of notifying the users of the timing to replace the clogged reverse osmosis filtration element of the drinking water purification system and indicating a plurality of operational condition data which are sent from the microprocessor, including a current time, a recorded time of when the previous replacement of each filtration element was made, a PPM value of the drinking water made, a current water making volume value which shows the current total volume of drinking water produced by each specific filtration element, a total water making volume value which shows the total volume of drinking water produced by the purification system, and a mechanical breakdown condition that illustrates whether the purification system is normally functioning or mechanically out of order. All the operational condition data are stored in the microprocessor.

Furthermore, in the ceasing step (6), the ceasing of the drinking water supply is operated by cutting off the electrical power to a water pressure pump of the system in order to stop the water pumping to the specific filtration element.

Alternatively, in the ceasing step (6), the ceasing of the supply of drinking water can also be operated by shutting off an electromagnetic gate installed in a water inlet or outlet of a filtration element.

I claim:

1. A drinking water purification system having at least a water pressure pump and a plurality of filtration elements including at least an impurity filter device, at least a reverse osmosis filtration element and at least an activated carbon filter connected in series wherein said water pressure pump pressurizes a raw water entering said impurity filter device for pre-purifying said raw water before feeding to said reverse osmosis filtration element, said drinking water purification system further comprising a monitoring device which comprises:

a microprocessor operable for storing a first predetermined reference value which is a water pressure value of a water inlet of said impurity filter device when said impurity filter device becomes ineffective, a second predetermined reference value which is a voltage value of water in a water outlet of said reverse osmosis filtration element when a PPM value of the drinking water discharged from said reverse osmosis filtration element is equal to four PPM, a third predetermined reference value which is a total water making volume value of said activated carbon filter, that is a total volume of the drinking water that said activated carbon filter is manufactured to produce before said activated carbon filter becomes ineffective;

an LCD indicator circuitry which is electrically connected to said microprocessor for notifying a user of a timing to replace each of said filtration elements and indicating a plurality of operational condition data sent from said microprocessor, said operational condition data including a current time, a recorded time showing when a previous replacement of each of said filtration elements was made, a current water making volume value that shows a current total volume of drinking water produced by each of said filtration elements, a total water making volume value, and a mechanical breakdown condition that illustrates whether said drinking water purification system is mechanically out of order;

a warning means, which is electrically connected to said microprocessor, for advancing a warning information signal to notify said user of said timing to replace each of said filtration elements, said warning means comprising a sound generating circuitry which comprises a sound circuit, a speaker driving circuit and a speaker all electrically connected, said sound circuit storing a sound track, said speaker driving circuit broadcasting said stored sound track as said warning information signal via said speaker;

a detecting means, which is electrically connected to said microprocessor for monitoring a functional condition of each of said filtration elements, comprising an impurity filter detecting circuitry, a reverse osmosis detecting circuitry and an activated carbon filter detecting circuitry, wherein said impurity filter detecting circuitry, which is electrically connected to said microprocessor, comprising a water pressure sensor installed to said water inlet of said impurity filter device, a plurality of operational amplifiers and an analog to digital converter all electrically connected, said water pressure sensor detecting an inlet water pressure of said impurity filter device and generating a pressure condition detecting value which is readable by one of said operational amplifiers, said first predetermined reference value being preset in another of said operational amplifiers, wherein when said pressure condition detecting value regarding said inlet water pressure rising to reach said first predetermined reference value, a first analog signal is sent to said analog to digital converter for converting into a first digital signal which is transmitted to said microprocessor which then activates said warning means to advance a first warning information signal to notify said user to replace said impurity filter device, said reverse osmosis detecting circuitry, which is electrically connected to said microprocessor, comprising a PPM detecting sensor, a plurality of operational amplifiers and an analog to digital converter all electrically connected, said PPM detecting sensor being installed in said water outlet of said reverse osmosis filtration element for detecting a PPM condition detecting value which is readable by one of said operational amplifiers, said second predetermined reference value being preset in another of said operational amplifiers, wherein when said reverse osmosis filtration element does not normally function and a PPM value detected by said PPM detecting sensor is higher than said second predetermined reference value, a second analog signal is sent to said analog to digital converter for converting into a second digital signal which is transmitted to said microprocessor which sends an activating signal to activate said warning means to advance a second warning information signal to notify said user to replace said reverse osmosis filtration element, and said activated carbon filter detecting circuitry which is electrically connected to said microprocessor for monitoring a functional condition of said activated carbon filter by detecting a quantity of a drinking water produced said activated carbon filter by means of a water flowmeter, wherein said water flowmeter is installed in a water outlet of said activated carbon filter for determining said functional condition of said activated carbon filter by transmitting a series of pulse waves to a calculator to compute an amount of said drinking water flowing out from said activated carbon filter, wherein said calculator receives and accumulates said pulse waves to achieve said current water making volume value that is a current volume of drinking water made by said activated carbon filter as a condition detecting value, wherein when said condition detecting value exceeds said predetermined reference value, a digital signal is sent from said activated carbon filter detecting circuitry to said microprocessor to activate said microprocessor to send out an activating signal to said sound generating circuitry to generate said sound information signal to notify said user to replace said activated carbon filter;

a power switching means, which is electrically connected to said microprocessor, comprising a power cutoff circuitry which comprises a first and a second transistor and a first and a second photoelectric driving power transistor all electrically connected, wherein when said first transistor is continuously activated by said microprocessor to conduct electricity, said first photoelectric driving power transistor activates said water pressure pump to pump water flowing through each of said filtration elements, wherein said microprocessor is programmed to periodically activate said second transistor to conduct electricity and cause said second photoelectric driving power transistor to activate said water pressure pump for backwashing and cleaning said reverse osmosis filtration element automatically, wherein when said warning means generates one of said warning information signals for a predetermined period of time, said microprocessor is programmed to send a ceasing signal to activate said first transistor to stop said water pressure pump for ceasing supply of water from said drinking water purification system; said first transistor and said photoelectric driving power transistor electrically connected, wherein when said warning means is activated to generate said warning information signal for a predetermined period of time, an activated signal is sent form said microprocessor to said power switching means to activate said transistor to conduct electricity, so that said photoelectric driving power transistor activates said electromagnetic gate to shut off said water passage connecting to said activated carbon filter for ceasing a water supply of said activated carbon filtration system; and an information input circuitry, which is electrically connected to said microprocessor for keying in said first, second and third predetermined reference values into said microprocessor, comprising an input keyboard which has a plurality of numeral keys from 0 to 9, a "SET" key and a "CLEAR" key, wherein said total water making volume value of said activated carbon filter is keyed in by pressing said numeral keys and saved by pressing said "SET" key and deleted by pressing said "CLEAR" key.

2. A drinking water purification system having at least a water pressure pump and a plurality of filtration elements including at least an impurity filter device, at least a reverse osmosis filtration element and at least an activated carbon filter connected in series wherein said water pressure pump pressurizes a raw water entering said impurity filter device for pre-purifying said raw water before feeding to said reverse osmosis filtration element, said drinking water purification system further comprising a monitoring device which comprises:

a microprocessor operable for storing a first predetermined reference value which is a water pressure difference value between a water inlet and a water outlet of said impurity filter device when said impurity filter device becomes ineffective, a second predetermined reference value which is a voltage value of water in a water outlet of said reverse osmosis filtration element when a PPM value of the drinking water discharged from said reverse osmosis filtration element is equal to four, a third predetermined reference value which is a total water making volume value of said activated carbon filter, that is a total volume of the drinking water that said activated carbon filter is manufactured to produce before said activated carbon filter becomes ineffective;

an LCD indicator circuitry which is electrically connected to said microprocessor for notifying a user of a timing to replace each of said filtration elements and indicating a plurality of operational condition data sent from said microprocessor, said operational condition data including a current time, a recorded time showing when a previous replacement of each of said filtration elements was made, a current water making volume value that shows a current total volume of drinking water produced by each of said filtration elements, a total water making volume value, and a mechanical breakdown condition that illustrates whether said drinking water purification system is mechanically out of order;

a warning means, which is electrically connected to said microprocessor, for advancing a warning information signal to notify said user of said timing to replace each of said filtration elements, said warning means comprising a sound generating circuitry which comprises a sound circuit, a speaker driving circuit and a speaker all electrically connected, said sound circuit storing a sound track, said speaker driving circuit broadcasting said stored sound track as said warning information signal via said speaker;

a detecting means, which is electrically connected to said microprocessor for monitoring a functional condition of each of said filtration elements, comprising an impurity filter detecting circuitry, a reverse osmosis detecting circuitry and an activated carbon filter detecting circuitry, wherein said impurity filter detecting circuitry, which is electrically connected to said microprocessor, comprising two identical impurity filter detecting circuitries each comprising a water pressure sensor and a plurality of operational amplifiers and an analog to digital converter all electrically connected, wherein said two water pressure sensors are respectively installed at a water inlet and a water outlet of said impurity filter for detecting an inlet water pressure and an outlet water pressure of said impurity filter device respectively and generating a pressure condition detecting value which is a differential pressure between said inlet water pressure and said outlet water pressure and are readable by one of said operational amplifiers of each of said impurity filter detecting circuitries, wherein when said pressure condition detecting value rising to reach said first predetermined reference value, a first analog signal is sent to said analog to digital converter for converting into a first digital signal which is transmitted to said microprocessor which then activates said warning means to advance a first warning information signal to notify said user to replace said impurity filter device, said reverse osmosis detecting circuitry, which is electrically connected to said microprocessor, comprising a PPM detecting sensor, a plurality of operational amplifiers and an analog to digital converter all electrically connected, said PPM detecting sensor being installed in said water outlet of said reverse osmosis filtration element for detecting a PPM condition detecting value which is readable by one of said operational amplifiers, said second predetermined reference value being preset in another of said operational amplifiers, wherein when said reverse osmosis filtration element does not normally function and a PPM value detected by said PPM detecting sensor is higher than said second predetermined reference value, a second analog signal is sent to said analog to digital converter for converting into a second digital signal which is transmitted to said microprocessor which sends an activating signal to activate said warning means to advance a second warning information signal to notify said user to replace said reverse osmosis filtration element, and said activated carbon filter detecting circuitry which is electrically connected to said microprocessor for monitoring a functional condition of said activated carbon filter by detecting a quantity of a drinking water produced said activated carbon filter by means of a water flowmeter, wherein said water flowmeter is installed in a water outlet of said activated carbon filter for determining said functional condition of said activated carbon filter by transmitting a series of pulse waves to a calculator to compute an amount of said drinking water flowing out from said activated carbon filter, wherein said calculator receives and accumulates said pulse waves to achieve said current water making volume value that is a current volume of drinking water made by said activated carbon filter as a condition detecting value, wherein when said condition detecting value exceeds said predetermined reference value, a digital signal is sent from said activated carbon filter detecting circuitry to said microprocessor to activate said microprocessor to send out an activating signal to said sound generating circuitry to generate said sound information signal to notify said user to replace said activated carbon filter;

a power switching means, which is electrically connected to said microprocessor, comprising a power cutoff circuitry which comprises a first and a second transistor and a first and a second photoelectric driving power transistor all electrically connected, wherein when said first transistor is continuously activated by said microprocessor to conduct electricity, said first photoelectric driving power transistor activates said water pressure pump to pump water flowing through each of said filtration elements, wherein said microprocessor is programmed to periodically activate said second transistor to conduct electricity and cause said second photoelectric driving power transistor to activate said water pressure pump for backwashing and cleaning said reverse osmosis filtration element automatically, wherein when said warning means generates one of said warning information signals for a predetermined period of time, said microprocessor is programmed to send a ceasing signal to activate said first transistor to stop said water pressure pump for ceasing water supply of said drinking water purification system; said first transistor and said photoelectric driving power transistor electrically connected, wherein when said warning means is activated to generate said warning information signal for a predetermined period of time, an activated signal is sent form said microprocessor to said power switching means to activate said transistor to conduct electricity, so that said photoelectric driving power transistor activates said electromagnetic gate to shut off said water passage connecting to said activated carbon filter for ceasing a water supply of said activated carbon filtration system; and an information input circuitry, which is electrically connected to said microprocessor for keying in said first, second and third predetermined reference values into said microprocessor, comprising an input keyboard which has a plurality of numeral keys from 0 to 9, a "SET" key and a "CLEAR" key, wherein said total water making volume value of said activated carbon filter is keyed in by pressing said numeral keys and saved by pressing said "SET" key and deleted by pressing said "CLEAR" key.

* * * * *